(12) United States Patent
Gao et al.

(10) Patent No.: US 8,919,651 B2
(45) Date of Patent: Dec. 30, 2014

(54) DATA READER HAVING COMPACT ARRANGEMENT

(75) Inventors: WenLiang Gao, Eugene, OR (US); Alan Shearin, Eugene, OR (US); Jorge L. Acosta, Eugene, OR (US); Ryan B. Thompson, Eugene, OR (US); Paul R. Huss, Eugene, OR (US); Jeffrey J. Hoskinson, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 308 days.

(21) Appl. No.: 13/188,244

(22) Filed: Jul. 21, 2011

(65) Prior Publication Data
US 2012/0018516 A1 Jan. 26, 2012

Related U.S. Application Data

(60) Provisional application No. 61/367,334, filed on Jul. 23, 2010.

(51) Int. Cl.
G06K 7/04 (2006.01)
G06K 7/10 (2006.01)
G06K 7/14 (2006.01)

(52) U.S. Cl.
CPC .......... G06K 7/10722 (2013.01); G06K 7/1417 (2013.01)
USPC ...................................... 235/454; 235/462.03

(58) Field of Classification Search
USPC .................. 235/454, 455, 462.03, 462.06
See application file for complete search history.

(56) References Cited

U.S. PATENT DOCUMENTS

| | | |
|---|---|---|
| 4,930,884 A | 6/1990 | Tichenor |
| 5,010,241 A | 4/1991 | Butterworth |
| 5,130,856 A | 7/1992 | Tichenor |
| 5,475,207 A | 12/1995 | Bobba |
| 5,572,008 A | 11/1996 | Sakai et al. |
| 5,705,802 A | 1/1998 | Bobba |
| 5,723,868 A | 3/1998 | Hammond |
| 5,837,988 A | 11/1998 | Bobba |
| 5,936,218 A | 8/1999 | Ohkawa |
| 6,189,795 B1 | 2/2001 | Ohkawa |
| 6,290,135 B1 | 9/2001 | Acosta |
| 6,318,635 B1 | 11/2001 | Stoner |
| 6,462,880 B1 | 10/2002 | Ohkawa |
| 6,568,598 B1 | 5/2003 | Bobba |
| 6,609,660 B1 | 8/2003 | Stoner |
| 6,631,844 B1 | 10/2003 | Ohkawa |
| 6,783,068 B2 | 8/2004 | Hecht |
| 6,974,084 B2 | 12/2005 | Bobba |
| 6,991,169 B2 | 1/2006 | Bobba |
| 7,178,734 B1 | 2/2007 | Hammer |
| 7,198,195 B2 | 4/2007 | Bobba |
| 7,204,420 B2 * | 4/2007 | Barkan et al. ............ 235/462.01 |
| 7,212,279 B1 | 5/2007 | Feng |
| 7,219,843 B2 * | 5/2007 | Havens et al. ........... 235/462.42 |

(Continued)

OTHER PUBLICATIONS

International Searching Authority, International Patent Application No. PCT/US2011/044877, International Search Report and Written Opinion, Jan. 11, 2012, 9 pages.

*Primary Examiner* — Daniel St Cyr
(74) *Attorney, Agent, or Firm* — Stoel Rives LLP

(57) ABSTRACT

A data reader including one or more imagers or imager assemblies that capture two-dimensional images of an object disposed in a view volume, the data reader having fold mirrors and other component arrangement that enable compact and efficient component configuration.

16 Claims, 14 Drawing Sheets

(56) References Cited

U.S. PATENT DOCUMENTS

| | | |
|---|---|---|
| 7,296,744 B2 | 11/2007 | He |
| 7,475,821 B2 | 1/2009 | Barkan |
| 7,490,770 B2 | 2/2009 | Shearin |
| 7,533,819 B2 | 5/2009 | Barkan et al. |
| 2004/0179254 A1 | 9/2004 | Lewis et al. |
| 2007/0035718 A1 | 2/2007 | Haddad |
| 2007/0175996 A1 | 8/2007 | Barkan et al. |
| 2008/0035733 A1 | 2/2008 | Vinogradov et al. |
| 2008/0191022 A1 | 8/2008 | Barkan et al. |
| 2009/0001166 A1 | 1/2009 | Barkan et al. |
| 2009/0001168 A1 | 1/2009 | Hammer |
| 2010/0219249 A1 | 9/2010 | Barkan |

\* cited by examiner

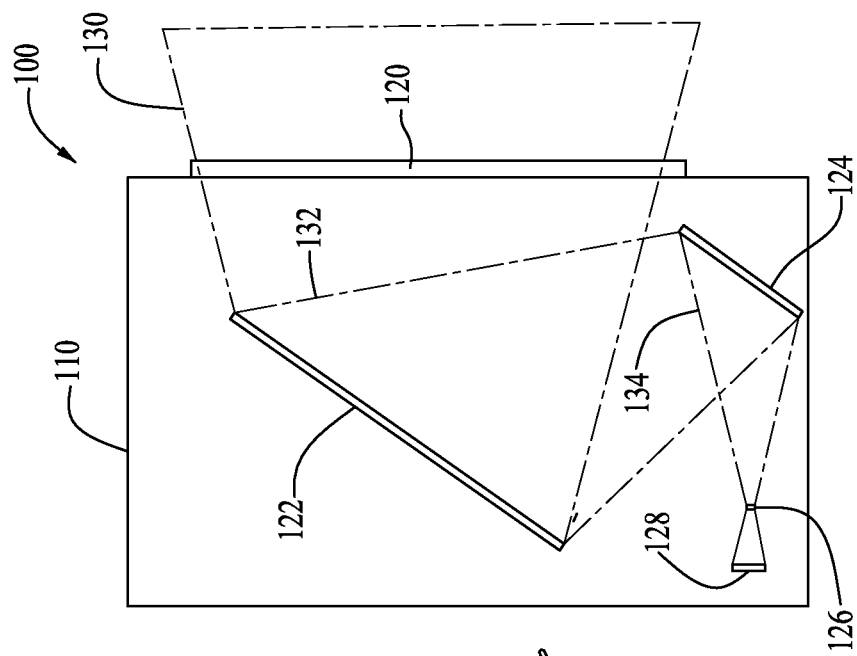
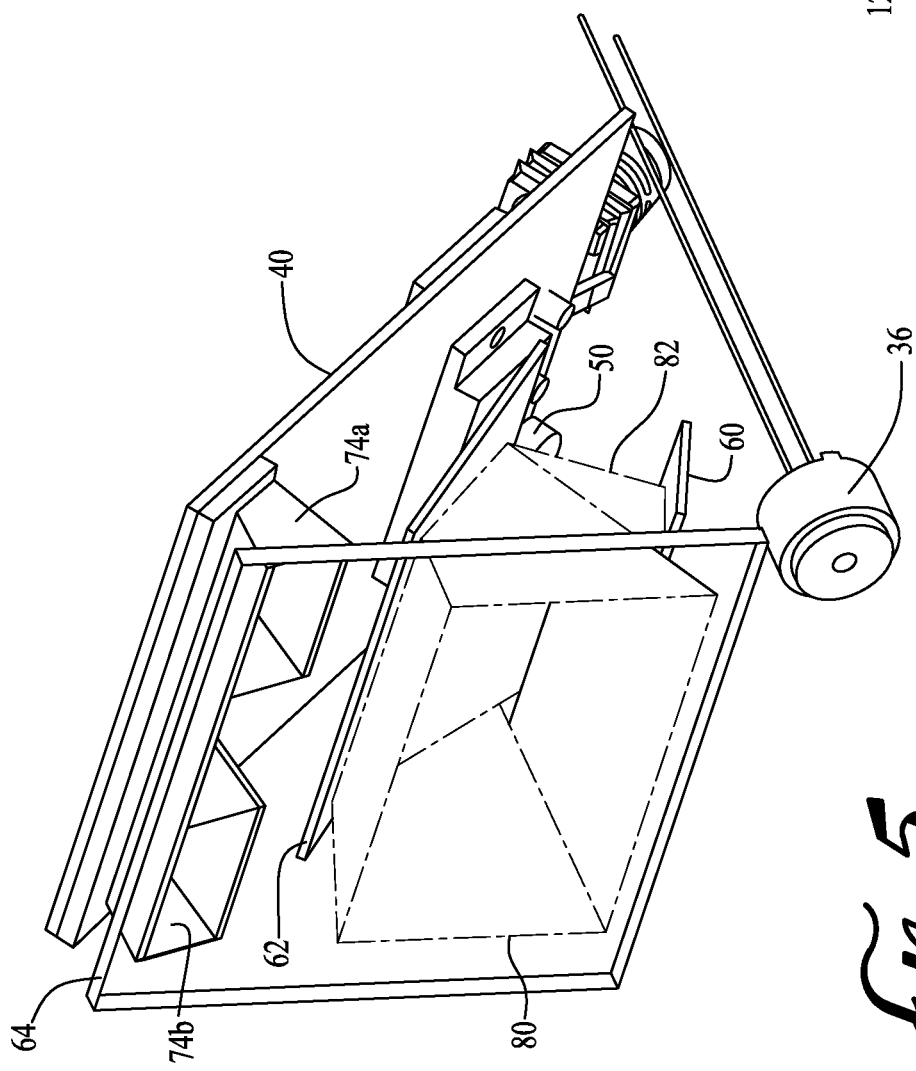

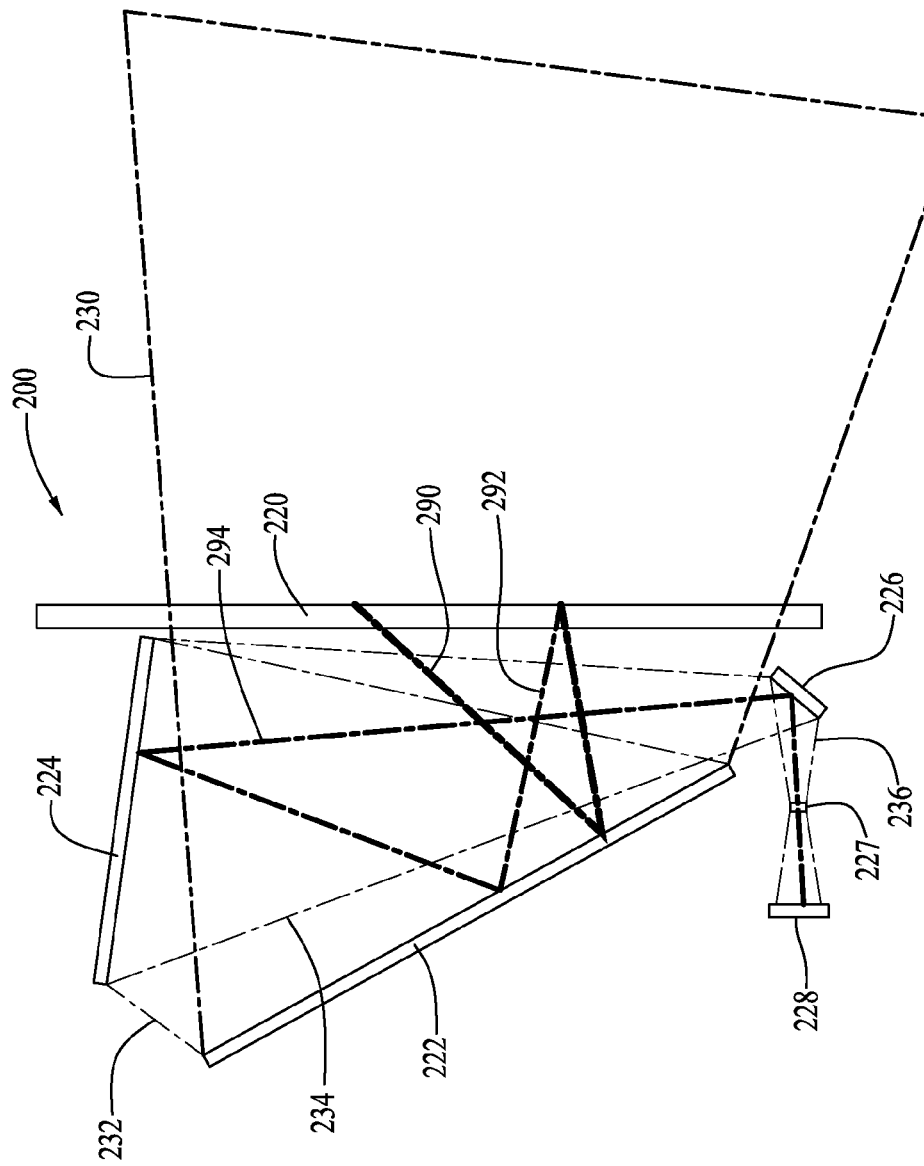

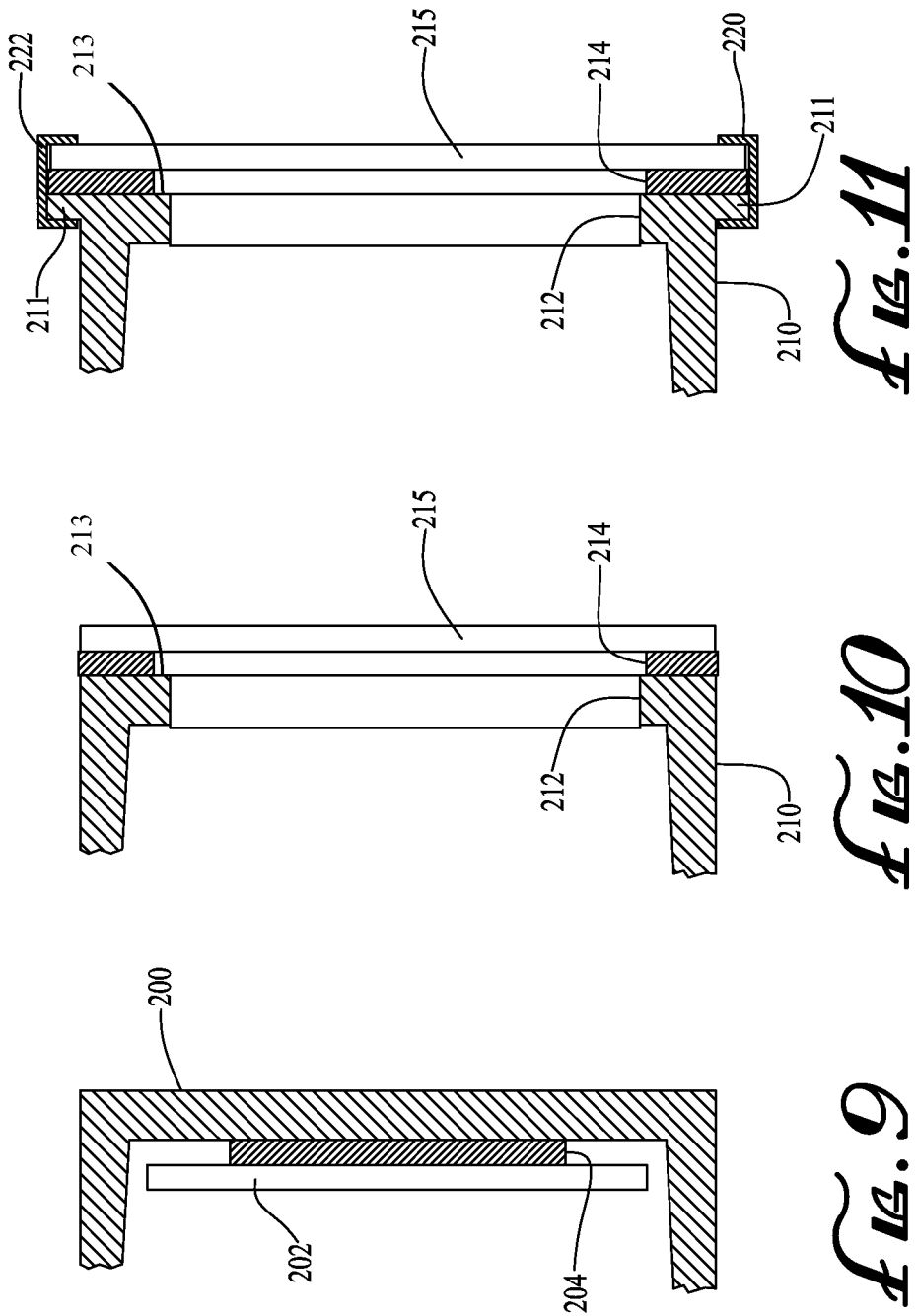

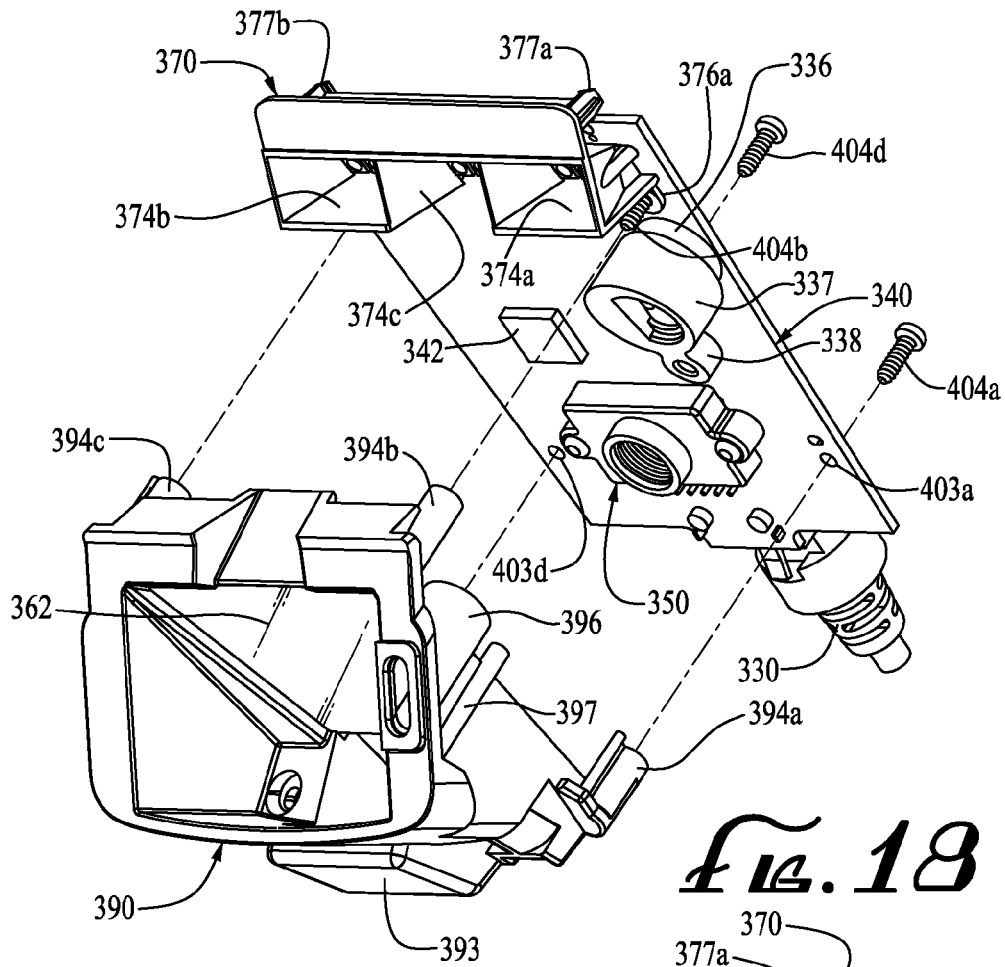
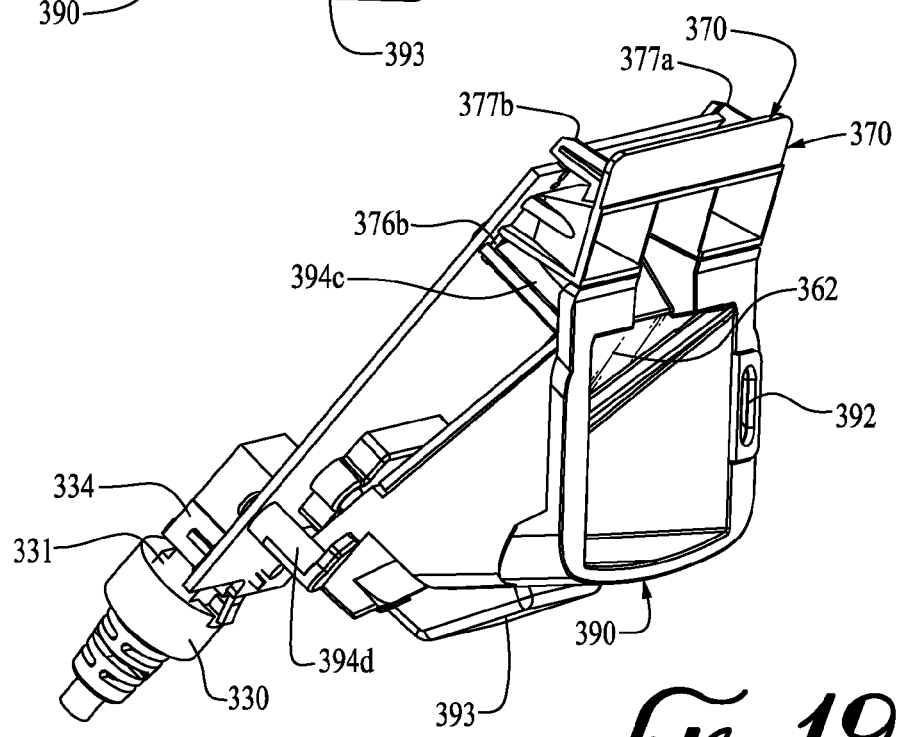

US 8,919,651 B2

DATA READER HAVING COMPACT ARRANGEMENT

RELATED APPLICATION DATA

This application claims priority to U.S. provisional application No. 61/367,334 filed Jul. 23, 2010, hereby incorporated by reference.

BACKGROUND

The field of the present disclosure relates generally to imaging, and more particularly but not exclusively to reading of optical codes such as, for example, barcodes.

Optical codes encode useful, optically-readable information about the items to which they are attached or otherwise associated. Perhaps the best example of an optical code is the barcode. Barcodes are ubiquitously found on or associated with objects of various types, such as the packaging of retail (e.g., the UPC code), wholesale, and inventory goods; retail product presentation fixtures (e.g., shelves); goods undergoing manufacturing; personal or company assets; documents; and document files. By encoding information, a barcode typically serves as an identifier of an object, whether the identification be to a class of objects (e.g., containers of milk) or a unique item.

Barcodes include alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a barcode reader must be able to reliably discern the pattern of bars and spaces, such as by determining the locations of edges demarking adjacent bars and spaces from one another, across the entire length of the barcode.

Barcodes are just one example of the many types of optical codes in use today. The most common barcodes are one-dimensional or linear optical codes, such as the UPC code or Code 39 barcode, where the information is encoded in one direction—the direction perpendicular to the bars and spaces. Higher-dimensional optical codes, such as, two-dimensional matrix codes (e.g., MaxiCode) or stacked codes (e.g., PDF 417), which are also sometimes referred to as "barcodes," are also used for various purposes.

An imager-based reader utilizes a camera or imager to generate electronic image data (typically in digital form) of an optical code. The image data is then processed to find and decode the optical code. For example, virtual scan line techniques are known techniques for digitally processing an image containing an optical code by looking across an image along a plurality of lines, typically spaced apart and at various angles, somewhat similar to the scan pattern of a laser beam in a laser-based scanner.

Imager-based readers often can only form images from one perspective—usually that of a normal vector out of the face of the imager. Imager-based readers may acquire images using ambient light or they may include illumination sources, e.g. LED's. When labels are oriented such that light from the illumination source is reflected directly back into the imager, the imager may fail to read properly due to uniform reflection washing out the desired image entirely, or the imager may fail to read properly due to reflection from a textured specular surface washing out one or more elements. This effect may cause reading of shiny labels to be problematic at particular reflective angles and labels oriented at extreme acute angles relative to the imager may not be readable. Moreover, outgoing illumination tends to undesirably reflect off the rear and front sides of the window and back onto the imager. In the case of fixed scanners, the view size at scanner nose needs to be large, typically 50 mm to 100 mm, which means the distance from imager to scanner nose needs to be long, for some scanners on the order of 70 mm to 120 mm. These and other physical and functional constraints make it difficult to achieve compact arrangement of data reader components, namely the window, printed circuit boards (PCB's), internal mirrors, and the imager.

The present inventor has, therefore, determined that it would be desirable to provide an imager-based reader that improves on the limitations of existing imager-based readers.

BRIEF DESCRIPTION OF THE DRAWINGS

FIG. 5 is a front left side isometric view of the data reader of FIG. 3.

FIG. 6 is a diagrammatic side view of an imager-type data reader according to a first alternate configuration.

FIG. 8 is a diagrammatic side view of an imager-type data reader according to a third alternate configuration.

FIG. 9 is a diagrammatic view of a conventional mirror mounting configuration in a data reader.

FIG. 10 is a diagrammatic view of a preferred embodiment for a minor mounting configuration in a data reader.

FIG. 11 is a diagrammatic view of an alternate embodiment for a mirror mounting configuration in a data reader.

FIG. 18 is an exploded view of the internal components of FIG. 17, partially assembled.

FIG. 19 is an isometric view of the internal components of FIGS. 17-18, fully assembled.

DETAILED DESCRIPTION OF EMBODIMENTS

With reference to the above-listed drawings, this section describes particular embodiments and their detailed construction and operation. The embodiments described herein are set forth by way of illustration only and not limitation. It should be recognized in light of the teachings herein that there is a range of equivalents to the example embodiments described herein. Most notably, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
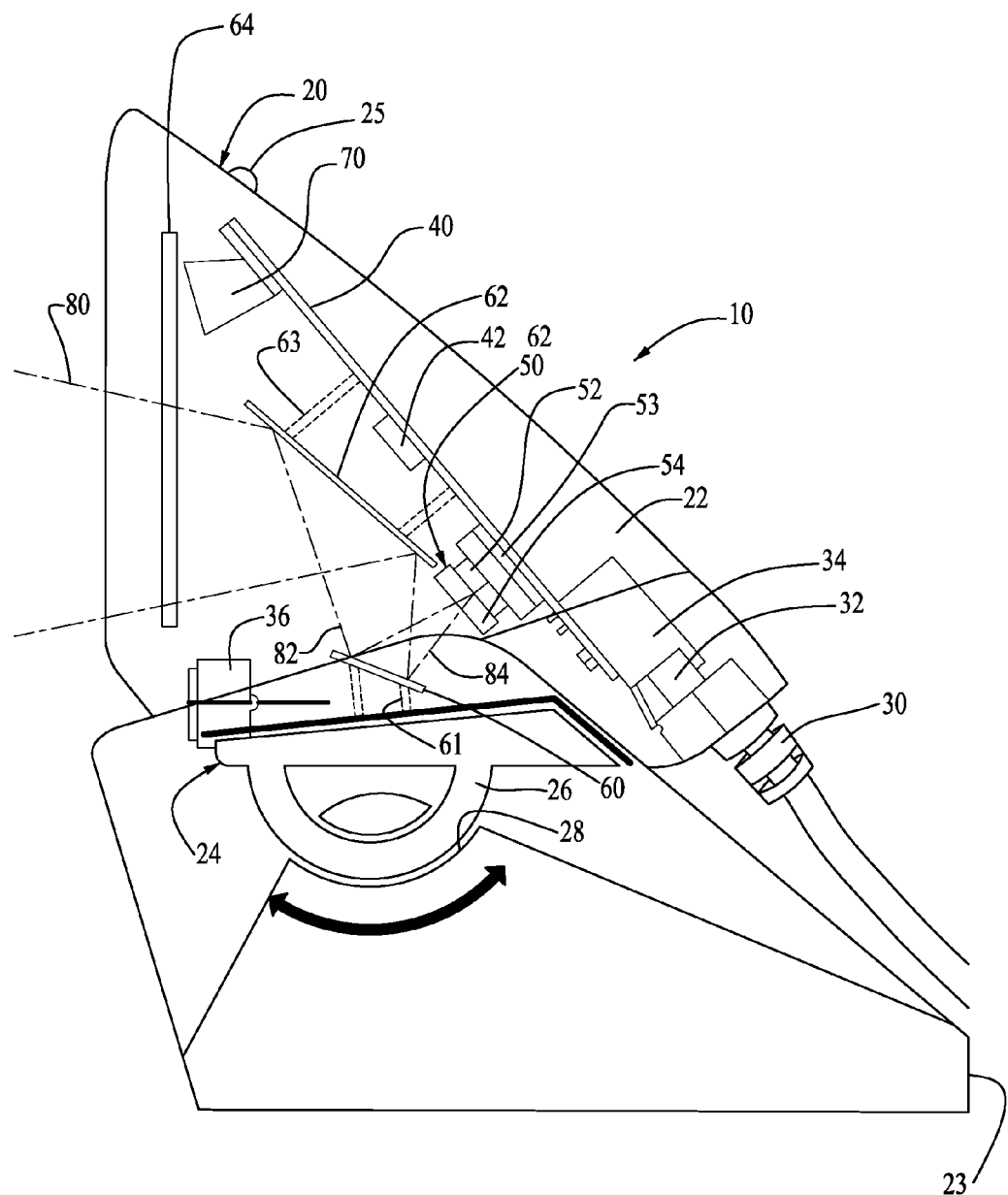
FIG. 1 is a diagrammatic side view of a presentation type data reader according to one preferred configuration and illustrating internal components.
Figure 2:
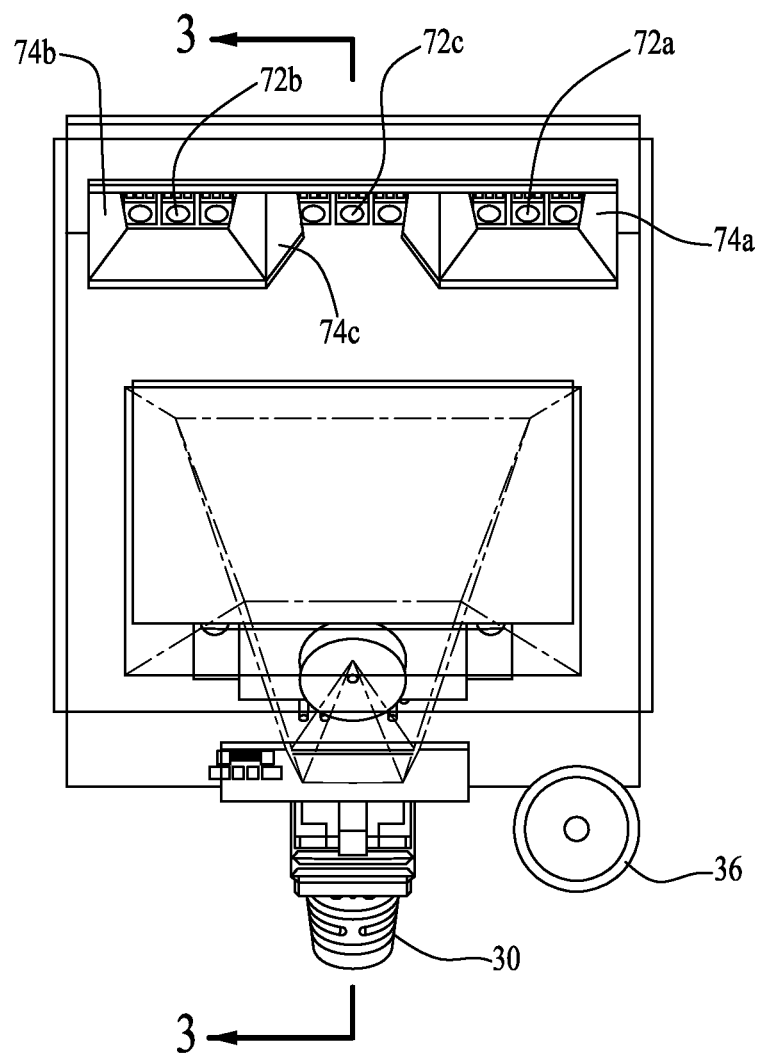
FIG. 2 is a diagrammatic front plan view of the data reader of FIG. 1.

FIGS. 1-5 illustrate a data reader 10 according to a first preferred embodiment. FIG. 1 in particular illustrates the reader 10 with a housing 20 having an upper section 22 pivotally attached to a base section 23. The connection between the upper housing section 22 and the base section 23 preferably includes a pivoting mechanism 24 as described below that allows tilting of the upper housing section 22 relative to the base section 23. The reader 10 includes a front window 64 at a front face thereof. As illustrated in FIG. 1, the reader 10 is set in a tilt position such that the window 64 is oriented generally vertically and facing generally sidewardly such as for reading a barcode on a vertical side of an item. The reader 10 may be tilted downwardly such that the window 64 is oriented in a diagonally downwardly facing direction that may be suitable for reading a barcode on a top side of an item, or may be tilted upwardly such that the window 64 is oriented in a diagonally upwardly facing direction suitable for reading a barcode on a bottom side of an item.

The reader 10 is shown having a generally curve-shaped upper housing 22 to accommodate grasping by a user's hand. An optional trigger or actuation button 25 may disposed at a suitable/convenient position on the housing 22; alternatively the trigger or actuation button 25 may be located on the base section 23. Alternately, the housing 22 may be of other shape configurations such as box-shaped. The compactness of the internal component configuration and housing enable the unit to be lifted and thus operated in a handheld mode.

The reader 10 may be linked to a host via a cable 30 or it may be linked via a wireless connection such as RF (e.g., Bluetooth, Zigbee), IR (infrared) or microwave. Alternately, the cable 30 may be connected to the base section 23, particularly suitable for embodiments wherein the base section 23 remains connected to the upper housing 22 in the handheld mode.

The reader 10 includes one or more printed circuit boards (PCBs) such as PCB 40 mounted within the upper housing section 22. The primary PCB 40 has a planar shape and is preferably mounted toward or on a rear side of the housing section 22, oriented at about an acute angle to the front window 64. The acute angle is preferable between 30° and 60° or on the order of 45°. Electronics mounted onto the PCB 40 include an RJ-45 connector 34, a microprocessor 42 and any memory, an imager assembly 50 (comprised of lens 52, two-dimensional sensor array 53, and aperture 54), and illumination system 70 (comprised of LEDs 72 and reflector cones 74). Also mounted within the housing section 22 are first minor 62 and second minor 60, the first mirror 62 being mounted via brackets 63 onto PCB 40 and second minor 60 being mounted via brackets 61 to the housing section 22. A two-dimensional image of an object 90 in the view volume 5 being captured from a perspective and propagated through the window 64 along a first image path segment 80 is reflected downward by a primary mirror 62 along a second image path segment 82 to a secondary minor 60 which reflects the image upward and/or sideward along a third image path segment 84 to the imager assembly 50 that may be supported on the PCB 40. The image may be focused by a suitable focusing lens 52 and aperture 54 positioned in front of the imaging array 53, the imaging array 53 capturing the two-dimensional image of the object 90. The primary mirror 62 is oriented at an acute angle to the window 64. The acute angle is preferably between 30° and 60° or on the order of 45°.

For purposes of description, a naming convention is used herein, whereby the primary mirror is the first reflection surface of the object image, the secondary mirror is the second reflection surface, and the tertiary mirror is the third reflection surface and so on, such that the image of the object reflects from the primary minor, to the secondary minor and then to the tertiary mirror. Thus in the reader 10, the first mirror 62 may be referred to as the primary mirror and the second mirror 60 may be referred to as a secondary minor whereby the image of the object 90 in the view volume 5 passes through the window 64 and is reflected by the primary mirror 62 to the secondary minor 60 and then to the imager assembly 50 which then acquires/captures a two-dimensional image of the object 90 and converts the image into electronic signal form for processing/decoding.

Figure 3:
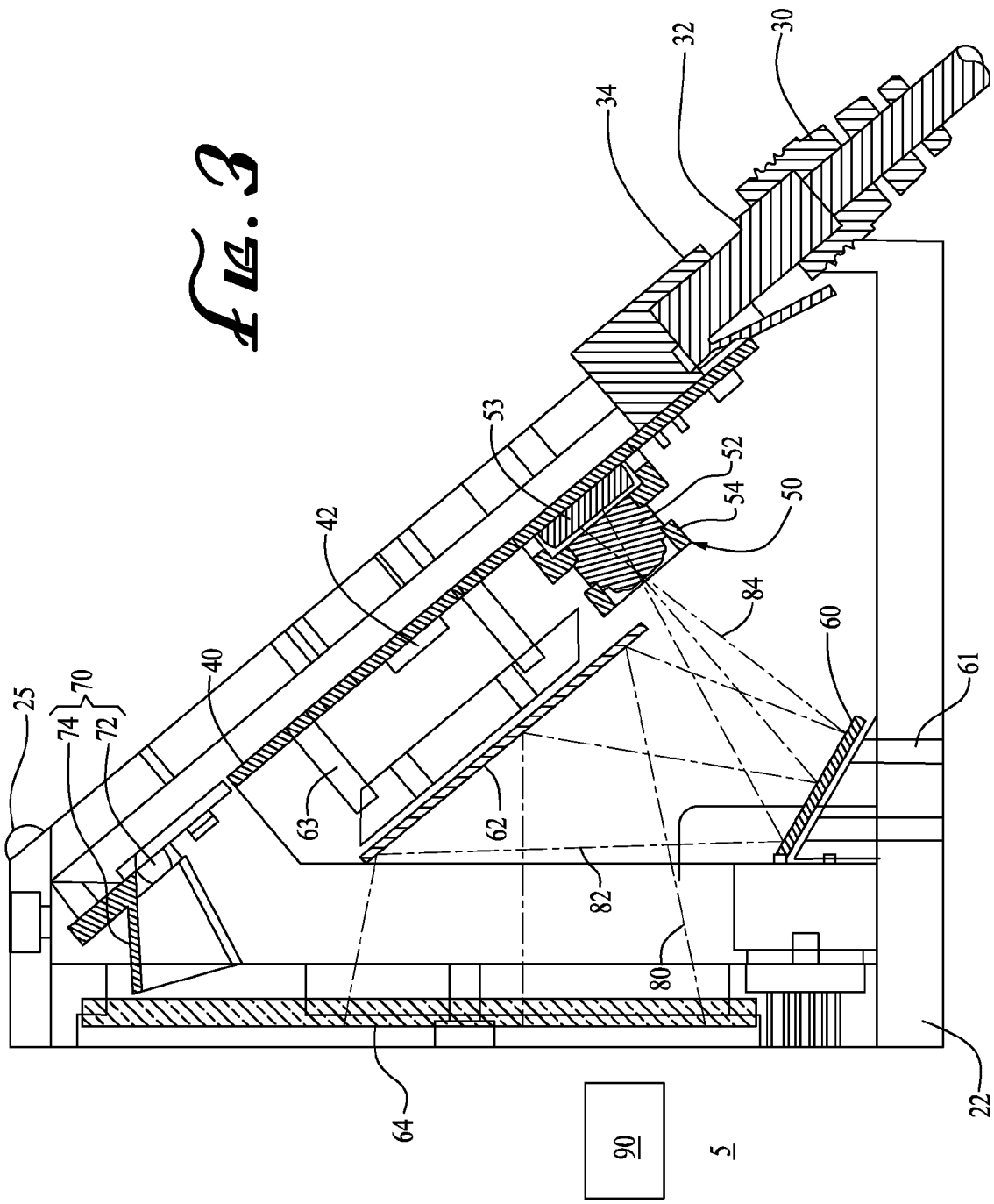
FIG. 3 is a diagrammatic partial cross-sectional view of the data reader of FIG. 2 taken along line 3-3 with the housing removed and with an alternate collection mirror.
Figure 4:
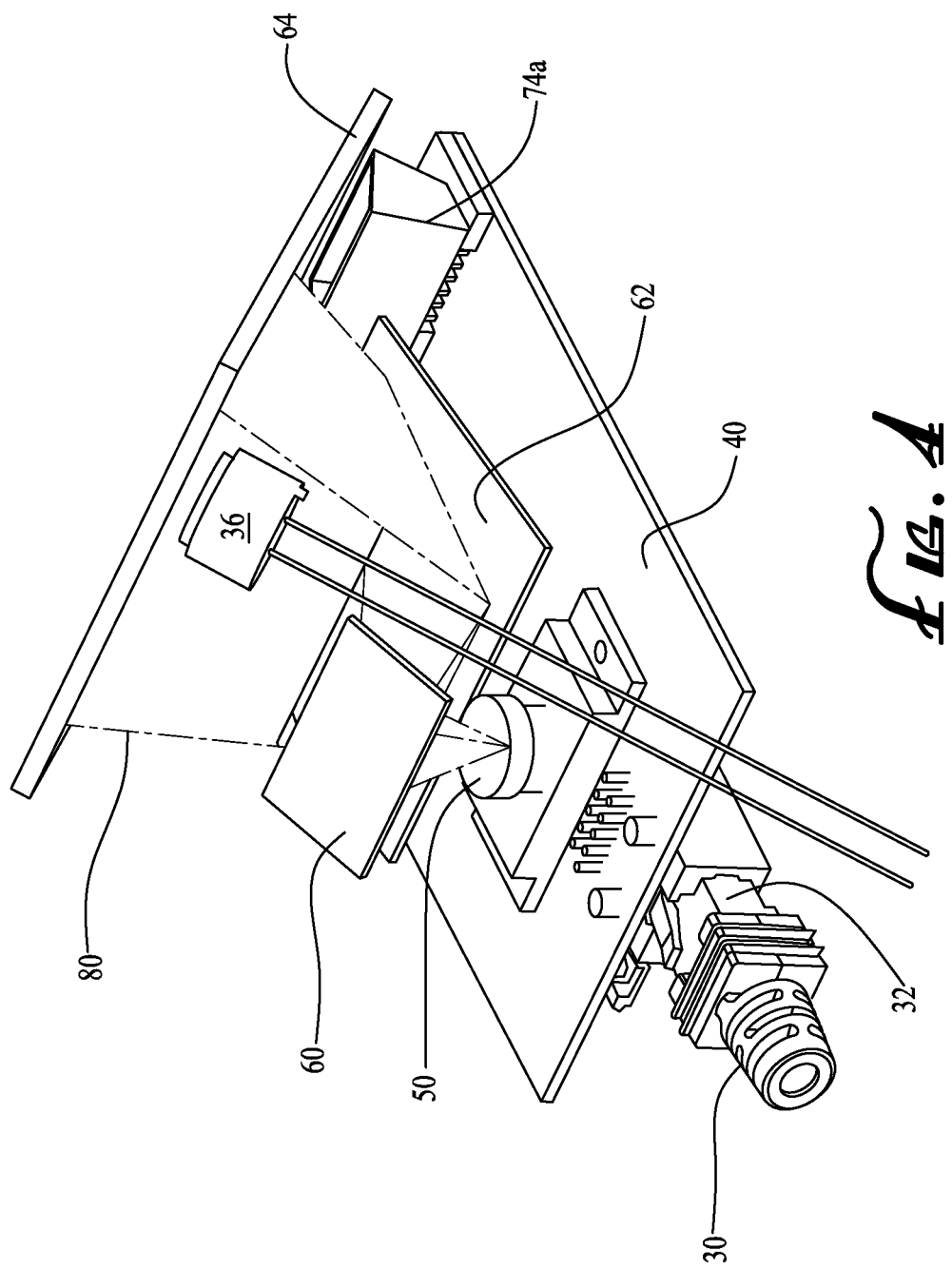
FIG. 4 is a bottom rear side isometric view of the data reader of FIGS. 1-3.

Mounted on the PCB 40 via mounting bracket 63, the primary minor 62 is disposed at a relatively small acute angle relative to the PCB 40, for example on the order of 10-15° or less. FIG. 1 shows an example with the minor 62 being oriented at an angle of about 60° to the front window 64 and about 12° to the PCB 40; FIG. 3 shows an example with the mirror 62 being oriented at an angle of about 45° to the front window 64 and about 0° or parallel to the PCB 40. Alternately, the minor 62 may be mounted/attached directly on the surface of the PCB 40 by a suitable attachment mechanism such as via screws, two-sided tape, or an adhesive.

The pivoting mechanism 24 includes a rounded male section 26 that nests into a corresponding cylindrical socket section 28 of the base section 23. The male cylindrical section 26 is secured within the cylindrical socket section 28 via a suitable attachment mechanism such as a pin and bushing combination. Other suitable connection mechanisms may be employed. For example, a magnetic coupling mechanism may secure the cylindrical section to the socket section, the magnetic force maintaining connection between the elements yet allow pivoting or even separation. In another arrangement, the lower section 26 may comprise a ball section that nests within the socket section 28, the ball snap-fitting into the socket held in place by a friction fit, yet allow pivoting and even separation.

The illumination system 70 is shown mounted at an upper region of the housing, with three sets of three LEDs 72a, 72b, 72c (the LEDs 72a-c being mounted on the PCB 40) with each LED set being disposed within a respective reflector array 74a, 74b, 74c operative to direct a field of view for the LED illumination along a desired outgoing pathway. Reflector array or cone 74a (on the right side of the reader 10 as viewed in FIG. 2) is formed in a cone-shape with four reflective inner surfaces operative to reflect and direct light from the three LEDs 72a disposed in the base of the cone. Similarly, the reflector array or cone 74b (on the left side of the reader 10 as viewed in FIG. 2) is formed in a cone-shape with four reflective inner surfaces operative to reflect and direct light from the three LEDs 72b disposed in the base of the cone. A third reflector array 74c is disposed between reflector arrays 70a and 70b with three LEDs 72c disposed therein. The third reflector array 74c may have a cone shape with four reflective surfaces but is shown with the lower reflective surface removed. LEDs 72 may be oriented so as to direct light at a small downward angle, approximately 10° to 15° from perpendicular to the window 64, so as to be less directly aimed toward the user with the result that the light does not appear too bright to the user.

The reader 10 also includes a speaker 36. In this configuration, the speaker 36 is disposed proximate a front surface of housing 22 and connected via wired connection to the PCB 40.

The PCB 40 is mounted proximate a rear wall of the housing section 22 and oriented at an acute angle of on the order of 30° to the front window 64 such that the imager 50 mounted on the PCB 40 does not directly face the window 64. Thus outgoing light from the illumination system 70 that back-reflects off of the window 64 is less likely to be reflected at an angle/direction so as to travel along a direct incoming path to the imager. Further by having the primary mirror 62 disposed at an acute angle (e.g., on the order of 45°) to the window 64, outgoing light from the illumination system 70 that back-reflects off of the window 64 is less likely to be reflected at an angle/direction so as to travel along the incoming paths 82, 84 to the imager 50.

Figure 13:
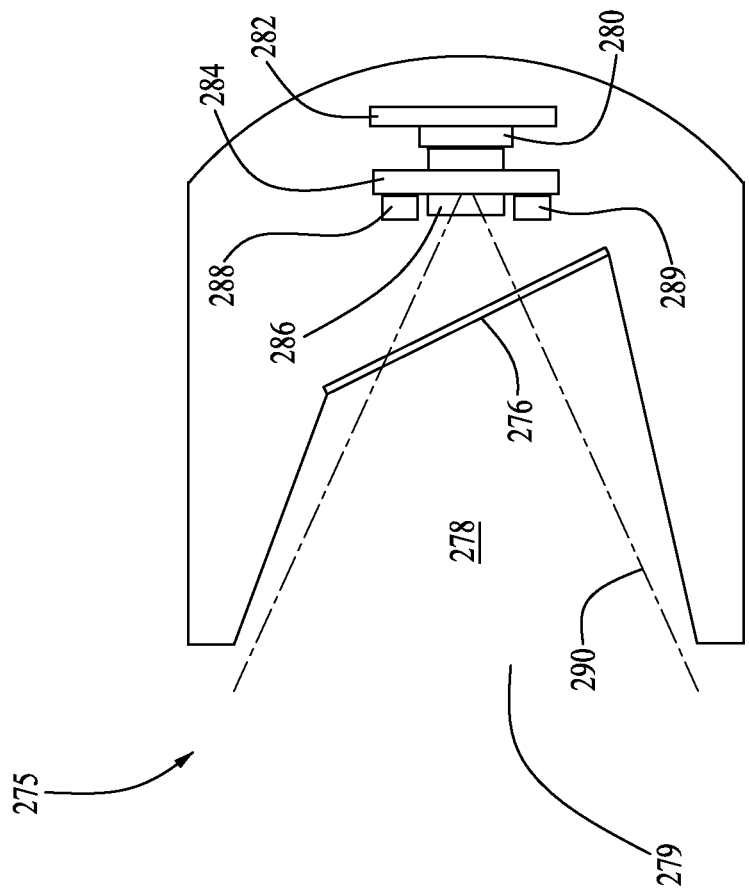
FIG. 13 is a diagrammatic side view of a presentation scanner with a slanted window and deep recess.
Figure 12:
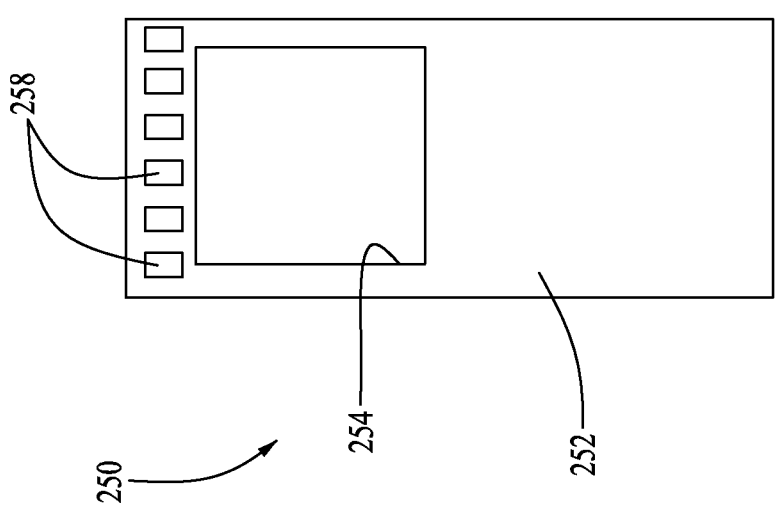
FIG. 12 is a diagrammatic front plan view of a presentation scanner with a single PCB layout with center opening in the PCB.

The combination of the orientation of the primary minor 62 relative to the window 64 and the orientation of the PCB 40 relative to the window 64 may be capable of achieve certain advantages such as one or more of the following:
- a compact configuration for reader components within the housing 22 yet having a large window read area;
- enabling both the imager 50 and the illumination LEDs 72 to be mounted on a common PCB 40;
- direct reflection of the incoming light path through the window to the imager 50 (via minors 62, 60) without requiring passage through a central opening in the PCB 40.
- the arrangement of the front window 64, primary minor 62 and PCB 40 allows reader 10 to be constructed with only one single PCB (the PCB 40 including illumination electronics, imager 54 and other parts) while maintaining a relatively large view size at window 64 and close to perpendicular arrangement between view direction 80 and the window 64. The arrangement of components in reader 10 may thus compare favorably versus the reader 250 illustrated in FIG. 12 that has a single board (PCB) 252 with a large central cutout 254 (the reader 250 may include multiple boards) and multiple illumination LEDs 258, 258 disposed on one end of the board 252. The arrangement of components in reader 10 may also compare favorable versus the reader 275 illustrated in FIG. 13 that has a large angle slanted window 276 and a deep mechanical recess area 278 behind the scanner nose 279 for accommodating the tilt of the window 276. FIG. 13 further illustrates an imager 280 mounted on a PCB 282, the imager having a field of view or image path 290 as focused by lens 286, the imager 280 acquiring/capturing a two-dimensional image of the object/target. The field of view is illuminated by illumination LEDs 288, 289 mounted on PCB 284.

The reader 10 is illustrated as a vertically-oriented reader, i.e., the window 64 being oriented generally vertically, but the unit orientation may be adjusted using the pivoting mechanism to orient the window 64 in either a diagonally downwardly tilted position or a diagonally upward titled position.

Figure 7:
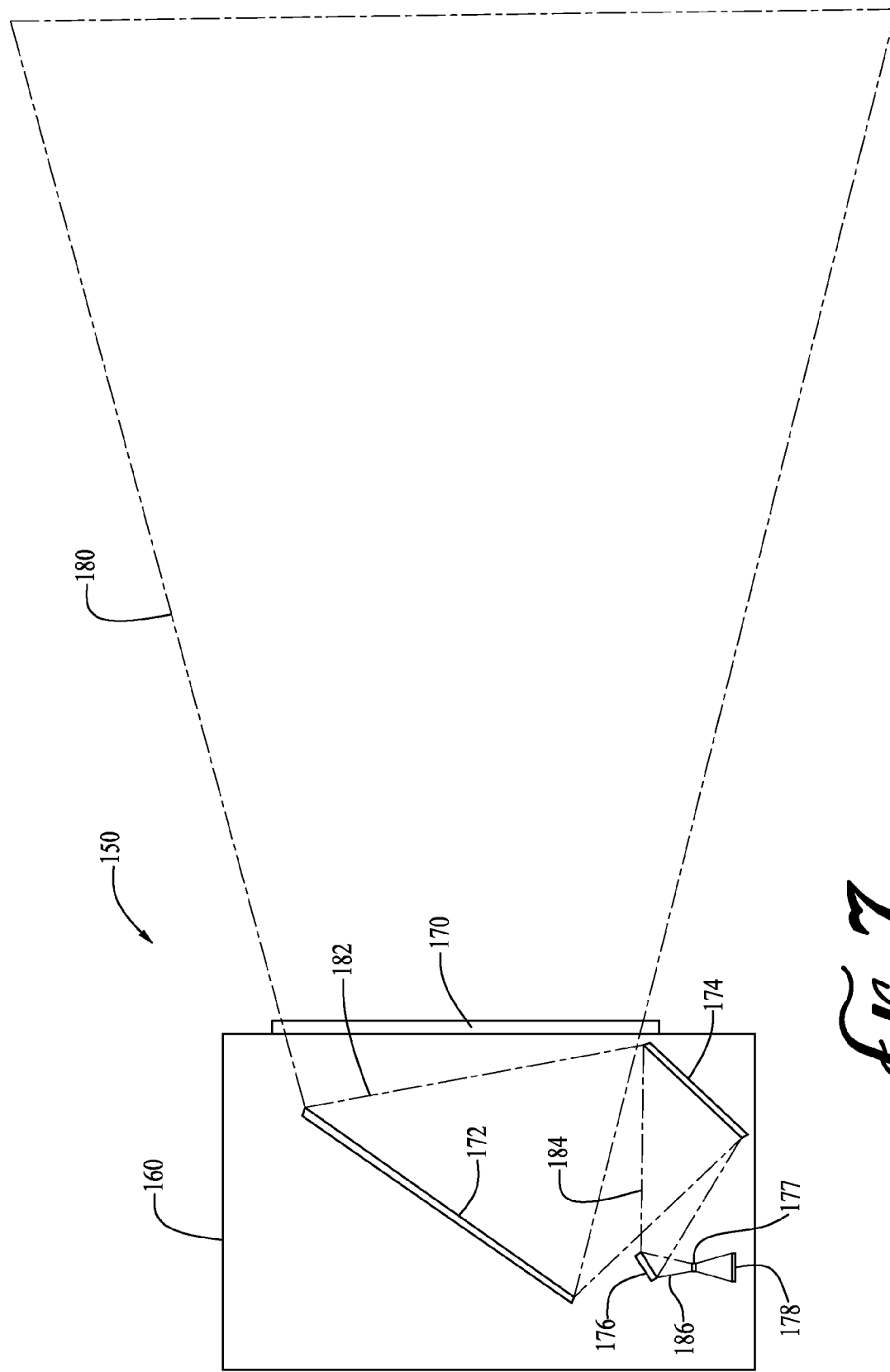
FIG. 7 is a diagrammatic side view of an imager-type data reader according to a second alternate configuration.

FIGS. 6 and 7 illustrate optical readers 100 and 150 of similar configuration according to first and second alternate embodiments. The reader 100 of FIG. 6 includes a housing 110 with a front, vertically-oriented window 120. An image of a field of view of a scan region passes through the window 120 along first image path segment 130 where it is reflected downwardly off of primary minor 122 along a second image path segment 132 to a secondary mirror 124 which reflects the image sidewardly and rearwardly along a third image path segment 134 to the imager assembly that include lens system 126 and detector array 128 that acquires/captures a two-dimensional image of the object. The sensor array 128 may be supported on a PCB disposed on a rear wall of the housing 110 in similar construction as in the reader 10 of FIG. 1. The primary mirror 122 is oriented at an acute angle to the window 120. The acute angle is preferable between 30° and 60° or on the order of 45°.

The reader 150 of FIG. 7 includes a housing 160 with a front, vertically-oriented window 170. An image of a field of view of a scan region passes through the window 170 along first image path segment 180 where it is reflected downwardly off of primary minor 172 along a second image path segment 182 to a secondary mirror 174 which reflects the image sidewardly and rearwardly and slightly upwardly along a third image path segment 184 to a tertiary minor 176 which reflects the image downwardly along a fourth image path segment 186 to the imager assembly that include lens system 177 and detector array 178 that acquires a two-dimensional image of the object. The sensor array 178 may be supported on a PCB disposed on a bottom wall of the housing 160 in similar construction as in the reader 10 of FIG. 1. The primary mirror 172 is oriented at an acute angle to the window 170. The acute angle is preferable between 30° and 60° or on the order of 45°.

The two-mirror system (primary mirror 122 and secondary mirror 124) of the reader 100 having a shorter internal path than the three-mirror system of the reader 150 requires a greater housing depth to accomplish the same field of view and depth of field as the reader 150.

FIG. 8 illustrates another alternate reader 200. The reader 200 has a three-bounce minor configuration. The reader 200 includes a housing with a vertically-oriented window 220. An image of a field of view of a scan region passes through the window 220 along first image path segment 230 where it is reflected upwardly off of primary minor 222 along a second image path segment 232 to a secondary mirror 224 which reflects the image downwardly along a third image path segment 234 to a tertiary minor 226 which reflects the image rearwardly along a fourth image path segment 236 to the imager assembly that include lens system 227 and detector array 228. The mirror edges are preferably positioned in close proximity to the scan volume to minimize reader depth. The sensor array 228 acquires a two-dimensional image of the target/object and it may be supported on a PCB disposed on a rear wall of the housing in similar construction as in the reader 10 of FIG. 1. Unlike the previous embodiments, off-axis light 290 reflecting off primary mirror 222 may back-reflect off of the window 200 and return along path 294 off of minors 222, 224 and 226 and undesirably reach the sensor array 228.

To achieve the desired window scan area, a suitable optical path length is 130 mm. Using the three-bounce minor configuration of reader 200, a minimum depth of the reader can be less than 60 mm. The two-bounce mirror configuration of reader 150 would require more depth. A single bounce minor configuration would require a tall reader.

Figure 14:
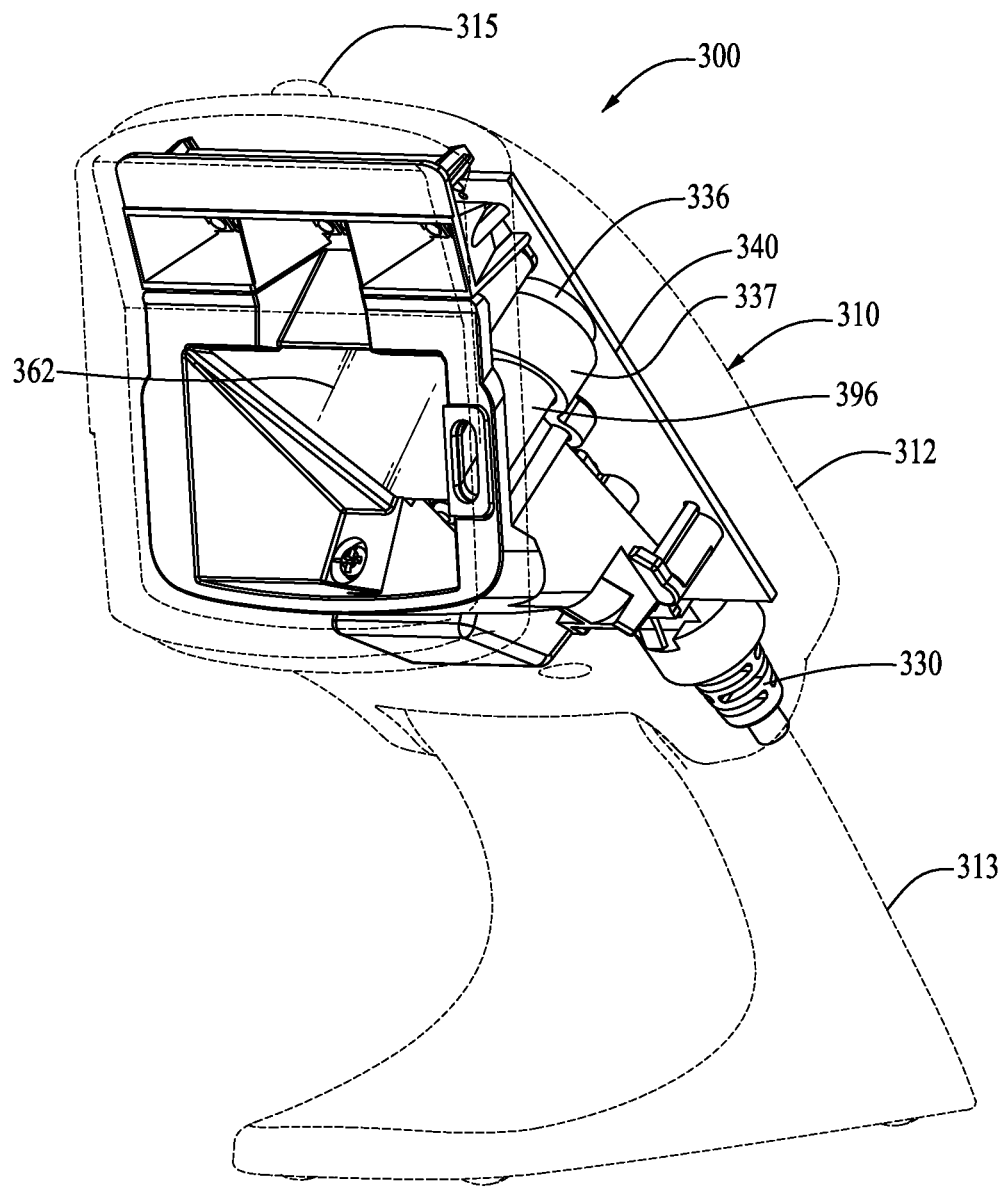
FIG. 14 is a diagrammatic isometric view of data reader according to another alternate embodiment.
Figure 15:
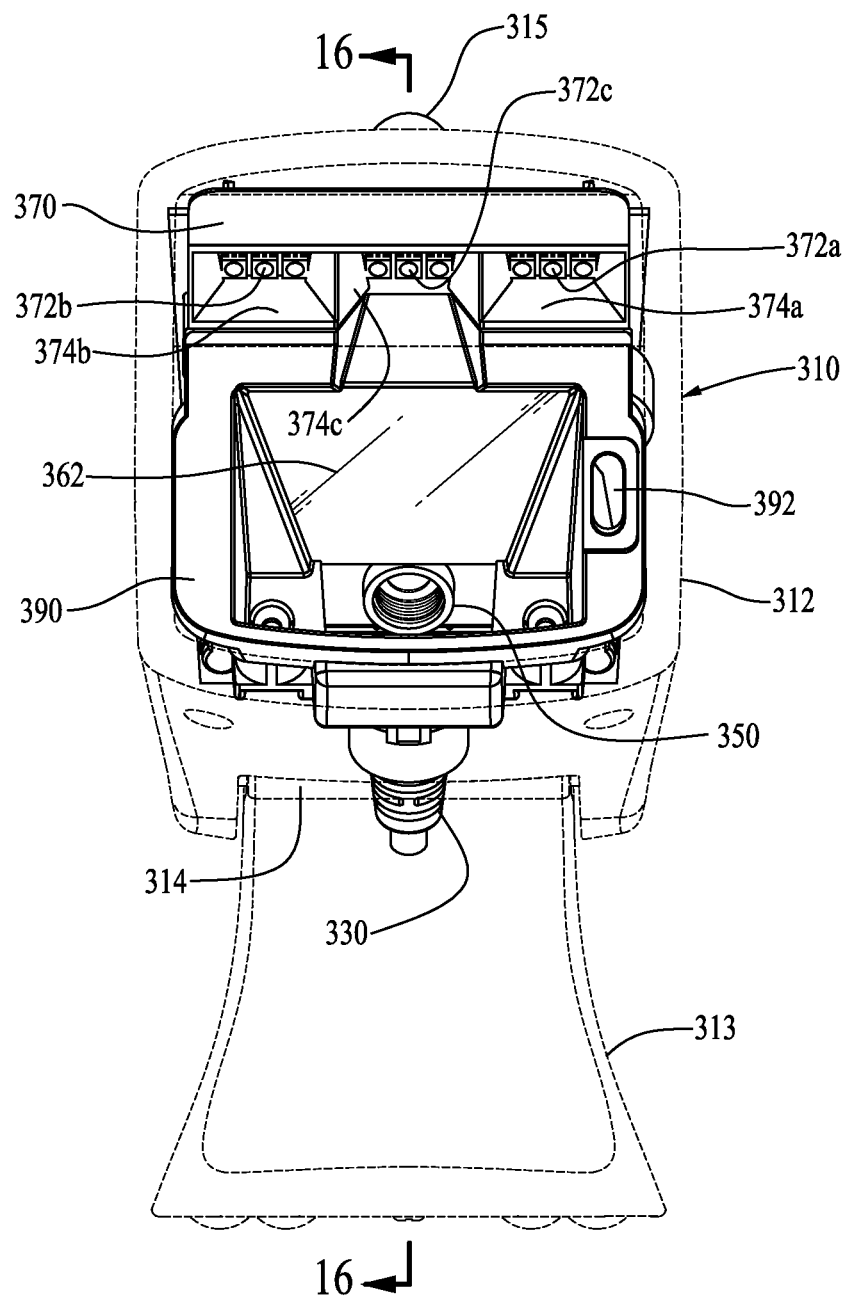
FIG. 15 is a front side elevation view of the data reader of FIG. 14.
Figure 16:
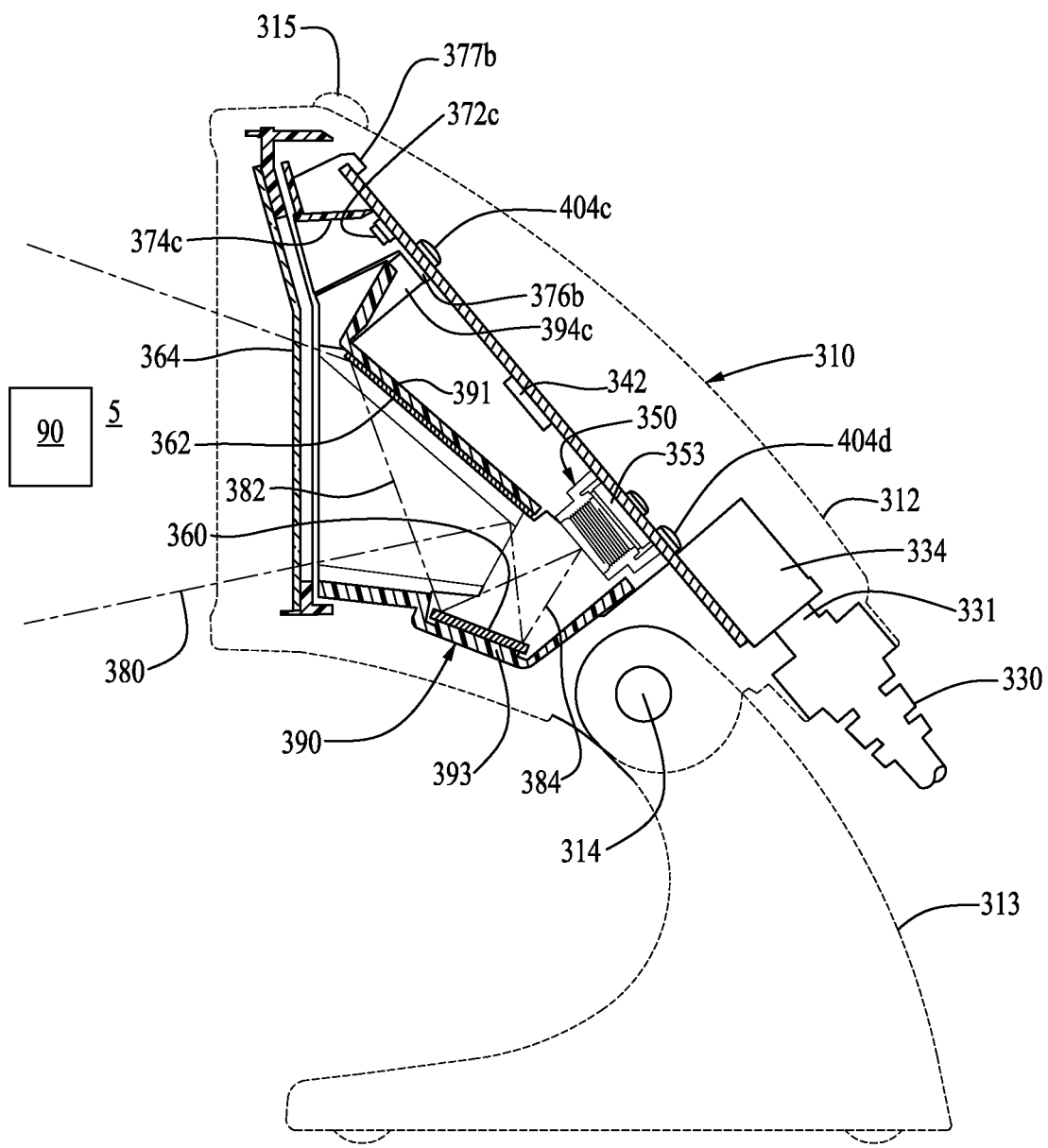
FIG. 16 is a cross-sectional view of the data reader of FIG. 15 taken along line 16-16.

FIGS. 14-19 illustrate a data reader 300 according to another embodiment. FIGS. 14-16 in particular illustrate the reader 300 with a housing 310 having an upper section 312 pivotally attached to a base or stand section 313. The connection between the upper housing section 312 and the base section 313 preferably includes a pivoting mechanism 314 that allows tilting of the upper housing section 312 relative to the base section 313. The reader 300 includes a front window 364 (removed in FIGS. 14-15 but shown in FIG. 16) at a front face of the upper housing section 312. In FIGS. 14-16 the reader 300 is shown at a tilt position such that the window 364 is oriented generally vertically and facing generally sidewardly such as for reading a barcode on a vertical side of an item. The reader 300 may be pivoted to tilt downwardly such that the window 364 is oriented in a diagonally downwardly facing direction that may be suitable for reading a barcode on a top side of an item, or may be pivoted/tilted upwardly such that the window 364 is oriented in a diagonally upwardly facing direction suitable for reading a barcode on a bottom side of an item.

The reader 300 may have a generally curve-shaped upper housing 312 to accommodate grasping by a user's hand. An optional trigger or actuation button 315 may disposed at a suitable/convenient position on the housing 312; alternatively the trigger or actuation button 315 may be located on the base section 313. Other actuation mechanisms such as disclosed in U.S. application Ser. No. 13/117,563 or U.S. Pat. No. 7,243,850 hereby incorporated by reference. Alternately, the housing 312 may be of other configurations such as box-shaped with one or more windows or other configurations such as the data readers described in U.S. Pat. No. 7,243,850.

The reader 300 may be linked to a host via a cable 330 at the upper housing section 312 connected via an suitable connector (e.g., the RJ-44 connector or it may be linked via a wireless connection such as RF (e.g., Bluetooth, Zigbee), IR or microwave. Alternately, the cable 330 may be connected to the base section 313, particularly suitable for embodiments wherein the base section 313 remains connected to the upper housing 312 in the handheld mode.

The reader 300 includes one or more printed circuit boards (PCBs) such as PCB 340 mounted within the housing section 312. The primary PCB 340 has a planar shape and is preferably mounted toward or on a rear side of the housing section 322, oriented at about an acute angle to the front window 364. The acute angle is preferable between 30° and 60° or on the order of 45°. Electronics mounted onto the PCB 340 include an imager assembly 350 (comprised of lens, sensor array 353, and aperture); microprocessor 342 (and other electronic circuitry such as memory, communication chip set, analog to digital converter, etc.); three sets of LEDs 372a, 372b, 372c; speaker 336 and an RJ-45 connector 334. The connector 334 accommodates the RJ-45 plug 331 on the end of the cable 330.

The reader 300 is functionally/optically similar to the reader 10 but includes a sub-housing or optics chassis 390. The first minor 362 and second mirror 360 are mounted to the optics chassis 390 to which various of the optical components are mounted and/or aligned. The optics chassis 390 is preferably constructed from molded optical plastic or other suitable construction providing a relatively high-precision structure which when attached/mounted to the PCB 340 provides for precise alignment within the housing of the first and second mirrors 362, 360 and the reflector array 370 with the imager 350 and LEDs 372a-c on the PCB 340.

As best viewed from the cross-sectional view of FIG. 16, an image of an object 90 in the view volume 5 is captured from a perspective and propagated (1) along a first image path 380, through the window 364, then onto the primary mirror 362, (2) the primary mirror 362 reflecting the image downwardly along a second image path segment 382 to the secondary mirror 360, (3) the secondary mirror 360 reflecting the image upwardly and/or sidewardly along a third image path segment 384 to the imager assembly 350, (4) the imager assembly capturing the two-dimensional image via the imaging array 353 converting the captured image into electronic form for processing/decoding. The imager assembly in this example is mounted/supported on the PCB 340. The image may be focused by a suitable focusing lens and aperture (similar to lens 52 and aperture 54 of FIG. 3) positioned in front of the imaging array 353. The primary minor 362 is oriented at an acute angle to the window 364. The acute angle in one example is selected between 30° and 60° or more particularly on the order of 45°.

For purposes and ease of description, the naming convention described above with respect to the reader 10 of FIG. 1 also applies to the reader 300, whereby the primary mirror 362 is the first reflection surface of the object image, the secondary minor 360 is the second reflection surface.

Figure 17:
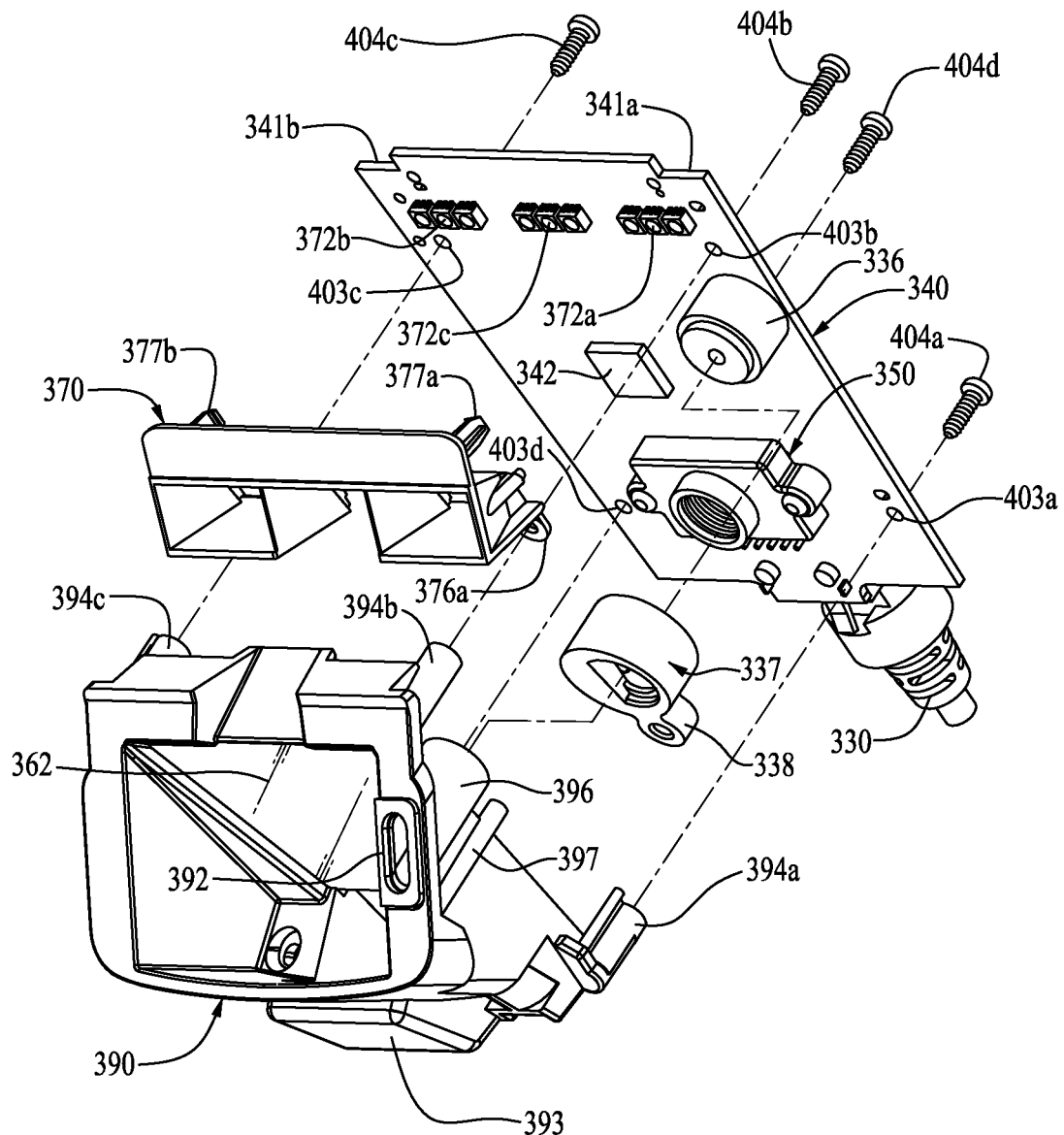
FIG. 17 is an exploded view of internal components of the data reader of FIGS. 14-16.

FIGS. 17-19 illustrate an assembly scheme for the various internal components of reader 300. FIG. 17 illustrates three main internal components in an exploded view, namely the optics chassis 390, the illumination reflector assembly 370, and the PCB 340. The reflector assembly 370 is constructed of a suitable material, such as molded optical plastic, and includes three reflector arrays 374a, 374b, 374c, upper mounting pins 377a, 377b and lower mounts 376a, 376b. The reflector assembly 370 is connected to the PCB 340 by (1) setting the mounting pins 377a, 377b into PCB corner notches or slots 341a, 341b; (2) aligning the openings of the lower mounts 376a, 376b with the PCB holes 403b, 403c; and (3) inserting the screws 404b, 404c through the holes 403b, 403c and through the openings of the lower mounts 376a, 376b. As shown in FIG. 18, once the reflector assembly 370 is mounted in position on the PCB 340, the reflector arrays 374a, 374b, 374c are aligned with and surround respective LED arrays 372a, 372b, 372c. As shown in FIG. 16, the post 377b has a notch which slips over/around the PCB 340 to provide for a secure connection for the top portion of the reflector assembly 370.

In one example construction, the optics chassis 390 is formed in a single piece from a suitable molding process such as injection molding. Similarly, the reflector assembly 370 may also be formed in a single piece from a suitable molding process such as injection molding.

The optics chassis 390 includes a first mounting surface or frame 391 onto which the primary minor 362 is mounted and a second mounting surface or frame 393 onto which the secondary mirror 360 is mounted. The optics chassis 390 is mountable to the PCB 340 via a suitable number of leg mounts (in this example, four leg mounts 394a, 394b, 394c, 394d are used). The reflector assembly 370 is connected to the PCB 340 by (1) aligning the leg mounts 394a, 394b, 394c, 394d with respective PCB holes 403a, 403b, 403c, 403d; (2) inserting the screws 404a, 404b, 404c, 404d through the holes 403a, 403b, 403c, 403d (with screws 404b, 404c passing also through the openings of the lower mounts 376a, 376b), and into the leg mounts 394a, 394b, 394c, 394d. The leg mounts 394a, 394b, 394c, 394d have a hollow interior with female threads into which the screws may be secured thereby securing/mounting the optics chassis 390 onto the PCB 340.

Construction is also simplified by location of the speaker 336 mounted on the PCB 340. The optics chassis 390 includes a hollow cylinder 396 with an oval shaped outer opening 392. A boot 337 of flexible rubber or plastic is inserted onto and around the rear end of the cylinder 396 (see FIGS. 17-18) and then when the optics chassis 390 is positioned onto the PCB 340 (see FIGS. 14-16), the cylinder 396 is aligned with the speaker 336 and the boot 337 is inserted around and onto the speaker 336. The boot provides an air or sound seal between the speaker 336 and the cylinder 396. Sound from the speaker 336 is thus transmitted through the cylinder and out the oval opening 392. The opening 392 may be oval, round, square or any suitable shape. The assist in alignment of the boot 337 onto the cylinder 396, the optics chassis 390 includes an alignment post 397 to one side of the cylinder 396. The boot 337 includes a corresponding flange 338 having a hole. When assembling, the boot 337 is positioned to slip onto the cylinder 396 with the flange slipping onto the alignment post 397.

Mounted and aligned via the optics chassis 390 onto the PCB 340, the primary mirror 362 is disposed at a relatively small acute angle relative to the PCB 340, for example on the order of 10-15° or less. FIG. 16 shows an example with the mirror 362 being oriented at an angle of about 60° to the front window 364 and about 12° to the PCB 340. Alternately, the optics chassis 390 may be constructed to arrange the mirrors 362, 360 at other suitable angles such as the angles of mirrors 62, 64 illustrated in FIG. 3 above.

The illumination system is shown mounted at an upper region of the housing, with LED sets 372a, 372b, 372c with each LED set having three LEDs. The LED sets 372a-c are mounted on the PCB 340 with each LED set being disposed within a respective reflector array 374a, 374b, 374c operative to direct a field of view for the LED illumination along a desired outgoing pathway. Reflector array or cone 374a (on the right side of the reader 300 as viewed in FIG. 15) is formed in a cone-shape with four reflective inner surfaces operative to reflect and direct light from the three LEDs 372a disposed in the base of the cone. Similarly, the reflector array or cone 374b (on the left side of the reader 300 as viewed in FIG. 15) is formed in a cone-shape with four reflective inner surfaces operative to reflect and direct light from the three LEDs 372b disposed in the base of the cone. A third reflector array 374c is disposed between reflector arrays 370a and 370b with three LEDs 372c disposed therein. The third reflector array 374c may have a cone shape with four reflective surfaces but is shown with the lower reflective surface removed. LEDs 372c may be oriented so as to direct light at a small downward angle, approximately 10° to 15° from perpendicular to the window 364, so as to be less directly aimed toward the user with the result that the light does not appear too bright to the user.

For purposes of description, the reader 10 in FIG. 1 is illustrated with a view path 80 (shown in dashed lines), the view path 380 encompassing the view volume 5 in front of the reader window 64. Similarly, the reader 300 in FIG. 16 is illustrated with a view path 380 (shown in dashed lines), the view path 380 encompassing the view volume 5 in front of the reader window 364. In these examples, the view volume may be referred to as the scan volume or scan region, the scan region being a 3D volume of space in which there is a high probability of a successful read of an optical code placed within that volume of space. It should be noted that the view volumes shown in the figures are not a precise representation of the volumetric region viewable through the windows by which the reader may be capable of reading objects placed therein. The view volume is typically bounded by the window 64 (or window 364) and extending outwardly to a maximum distance within the depth of field of the reader. The view volumes in the other figures are illustrated and may be described in similar fashion. It is further noted in the reader 10 of FIG. 1, light from the illumination system 70 passes through the top portion of the window 64 and in this example, the view volume 80 is bounded at lower portion of the window 64. Alternately, the front window may be bisected into separate windows, one window for the light path of the illumination system 70 and one window for the image path 80. The components of the reader 300 may be similarly described.

The mirror components are preferably high quality reflect optics and may be formed by any suitable process such as by forming a monolithic piece or substrate (e.g., a metal or plastic) and then applying reflective coatings.

The reader 10 and the reader 300 are illustrated with three LED arrays for illumination, but fewer or more arrays may be employed. Though not illustrated, the reader 100 of FIG. 6 and the reader 150 of FIG. 7 may be provided with similar illumination systems. In some embodiments, different wavelengths of light may be directed to illuminate different regions of an object from different perspectives. In some embodiments, the one or more of the light sources may be operated in a pulsed mode, the pulsing synchronized with the imager frame rate. In one example, the imagers may be selected with a frame rate of 30 Hz and one or more of the light sources used to illuminate the read region are pulsed at 60 Hz. Examples of light source pulsing is described in U.S. Pat. No. 7,234,641, hereby incorporated by reference.

Moreover, though the configurations of the reader 10 in FIG. 1 and reader 300 in FIG. 14 are shown having a single planar PCB 40/34, other configurations may be implemented. For example, the PCB may be non-planar. Alternately, the reader may include multiple PCBs. In one example of a two PCB construction, the reader includes (1) a first PCB containing the imager and the microprocessor, and wherein the first mirror or the optics chassis is mounted; and (2) a second PCB having the illumination LEDs and upon which the illumination reflector is mounted.

In addition to the variations and combinations previously presented, the various embodiments may advantageously employ lenses and light baffles, other arrangements, and/or image capture techniques disclosed in U.S. Pat. Pub. No. 2007/0297021, the disclosure of which is hereby incorporated by reference.

In another aspect, FIG. 10 illustrates a mirror mounting configuration for mirror within a reader such as the reader 10 of FIG. 1 or such as the reader 300 of FIG. 14. Typically as shown in FIG. 9, a mirror 202 is mounted within a scanner housing via two-sided tape 204 on the rear surface of the mirror 202 and onto a mounting surface 200 such as a rear wall. In accordance with a construction as illustrated in FIG. 10, a mirror basket or housing wall 210 is provided with an opening 212 and the mirror 215 is positioned behind the opening 212 secured by two-sided tape 214 positioned between the top surface of the mirror 215 and the rear surface 213 of the wall 210. Alternately, the mirror 215 may be secured to the rear surface 213 of the wall 210 via an adhesive, via clips, or some other suitable attachment/securing mechanism. For example, FIG. 11 illustrates an alternate attachment mechanism whereby the wall 210 includes an outer lip 211 and the mirror 215 is secured to the lip 211 by clips 220, 222 with a compressive foam tape 214 disposed therebetween.

In contrast to the conventional configuration as in FIG. 9, the edges of the mirror 215 are not visible (being hidden behind the basket opening 212) and the visible reflective area of the mirror is defined by the dimensions of the opening 212. The visible reflective area of the mirror 215 may be considered as being framed by the wall opening 212. Moreover, the tolerance requirements for the mirror 215 are relaxed because the reflective area is defined by the size of the opening 212 rather than dimensions of the mirror 215.

A fixed virtual scan line pattern, preferably an omnidirectional pattern, may be used to decode images such as used in the Magellan-1000i model scanner made by Datalogic Scanning, Inc. of Eugene, Oreg. In some embodiments, alternative techniques may be employed such as (a) processing based on a vision library may be used with one or more of the imagers;

(b) processing according to a hybrid of virtual scan line pattern and vision library such as every nth number of frame call vision library once.

In order to reduce the amount of memory and processing required to decode linear and stacked barcodes, an adaptive virtual scan line processing method may be employed. The VSLs are linear subsets of the 2-D image, arranged at various angles and offsets. These virtual scan lines can be processed as a set of linear signals in a fashion conceptually similar to a flying spot laser scanner. The image can be deblurred with a one dimensional filter kernel instead of a full 2-D kernel, thereby reducing the processing requirements significantly.

The rotationally symmetric nature of the lens blurring function allows the linear deblurring process to occur without needing any pixels outside the virtual scan line boundaries. The virtual scan line is assumed to be crossing roughly orthogonal to the bars. The bars will absorb the blur spot modulation in the non-scanning axis, yielding a line spread function in the scanning axis. The resulting line spread function is identical regardless of virtual scan line orientation. However, because the pixel spacing varies depending on rotation (a 45 degree virtual scan line has a pixel spacing that is 1.4× larger than a horizontal or vertical scan line) the scaling of the deblurring equalizer needs to change with respect to angle.

If the imager acquires the image of a stacked barcode symbology, such as Data bar or PDF-417 code, the imaging device can start with an omnidirectional virtual scan line pattern (such as an omnidirectional pattern) and then determine which scan lines may be best aligned to the barcode. The pattern may then be adapted for the next or subsequent frame to more closely align with the orientation and position of the barcode such as a closely-spaced parallel line pattern. Thus the device can read highly truncated barcodes and stacked barcodes with a low amount of processing compared to a reader that processes the entire image in every frame.

Partial portions of an optical code (from multiple perspectives) may be combined to form a complete optical code by a process known as stitching. Though stitching may be described herein by way of example to a UPCA label, one of the most common types of optical code, it should be understood that stitching can be applied to other type of optical labels. The UPCA label has "guard bars" on the left and right side of the label and a center guard pattern in the middle. Each side has 6 digits encoded. It is possible to discern whether either the left half or the right half is being decoded. It is possible to decode the left half and the right half separately and then combine or stitch the decoded results together to create the complete label. It is also possible to stitch one side of the label from two pieces. In order to reduce errors, it is required that these partial scans include some overlap region. For example, denoting the end guard patterns as G and the center guard pattern as C and then encoding the UPCA label 012345678905, the label could be written as G012345C678905G.

Stitching left and right halves would entail reading G012345C and C678905G and putting them together to get the full label. Stitching a left half with a 2-digit overlap might entail reading G0123 and 2345C to make G012345C. One example virtual scan line decoding system may output pieces of labels that may be as short as a guard pattern and 4 digits. Using stitching rules, full labels can assembled from pieces decoded from the same or subsequent images from the same camera or pieces decoded from images of multiple cameras. Further details of stitching and virtual line scan methods are described in U.S. Pat. Nos. 5,493,108 and 5,446,271, which are herein incorporated by reference.

In some embodiments, a data reader includes an image sensor or array that is progressively exposed to capture an image on a rolling basis, such as a CMOS imager with a rolling shutter. The image sensor is used with a processor to detect and quantify ambient light intensity. Based on the intensity of the ambient light, the processor controls integration times for the rows of photodiodes of the CMOS imager. The processor may also coordinate when a light source is pulsed based on the intensity of the ambient light and the integration times for the photodiode rows.

Depending on the amount of ambient light and the integration times, the light source may be pulsed one or more times per frame to create stop-motion images of a moving target where the stop-motion images are suitable for processing to decode data represented by the moving target. Under bright ambient light conditions, for example, the processor may cause the rows to sequentially integrate with a relatively short integration time and without pulsing the light source, which creates a slanted image of a moving target. Under medium light conditions, for example, the rows may integrate sequentially and with an integration time similar to the integration time for bright ambient light, and the processor pulses the light source several times per frame to create a stop-motion image of a moving target with multiple shifts between portions of the image. The image portions created when the light pulses may overlie a blurrier, slanted image of the moving target. Under low light conditions, for example, the processor may cause the rows to sequentially integrate with a relatively long integration time and may pulse the light source once when all the rows are integrating during the same time period. The single pulse of light creates a stop-motion image of a moving target that may overlie a blurrier, slanted image of the moving target.

In some embodiments, a data imager contains multiple CMOS imagers and has multiple light sources. Different CMOS imagers "see" different light sources, in other words, the light from different light sources is detected by different CMOS imagers. Relatively synchronized images may be captured by the multiple CMOS imagers without synchronizing the CMOS imagers when the CMOS imagers operate at a relatively similar frame rate. For example, one CMOS imager is used as a master so that all of the light sources are pulsed when a number of rows of the master CMOS imager are integrating.

Another embodiment pulses a light source more than once per frame. Preferably, the light source is pulsed while a number of rows are integrating, and the number of integrating rows is less than the total number of rows in the CMOS imager. The result of dividing the total number of rows in the CMOS imager by the number of integrating rows is an integer in some embodiments. Alternatively, in other embodiments, the result of dividing the total number of rows in the CMOS imager by the number of integrating rows is not an integer. When the result of dividing the total number of rows in the CMOS by the number of integrating rows is an integer, image frames may be divided into the same sections for each frame. On the other hand, when the result of dividing the total number of rows in the CMOS by the number of integrating rows is not an integer, successive image frames are divided into different sections.

Other embodiments may use a mechanical shutter in place of a rolling shutter to capture stop-motion images of a moving target. The mechanical shutter may include a flexible member attached to a shutter that blocks light from impinging a CMOS or other suitable image sensor. The shutter may be attached to a bobbin that has an electrically conductive material wound around a spool portion of the bobbin, where the spool portion faces away from the shutter. The spool portion of the bobbin may be proximate one or more permanent magnets. When an electric current runs through the electrically conductive material wound around the spool, a magnetic field is created and interacts with the magnetic field from the one or more permanent magnets to move the shutter to a position that allows light to impinge a CMOS or other suitable image sensor.

These and other progressive imaging techniques are described in detail in U.S. Pub. Pat. Application No. 2010/0165160 entitled "Systems and Methods For Imaging," hereby incorporated by reference.

The readers 10, 100 and 150 are illustrated as a single window reader with the window vertically oriented, but it may be incorporated into other configurations such as for example an upwardly facing, in-counter/horizontal reader. In another configuration, multiple reader modules may be disposed in a multi-window reader providing views of a read volume from different directions/perspectives.

Though described primarily with respect to a checker-assisted data reader, the readers and methods described herein may be employed in a self-checkout system. The optical readers described herein may be employed in an automatic reader, such as a tunnel scanner employing multiple reader modules that obtain multiple perspectives through multiple viewing windows.

It is intended that subject matter disclosed in portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

We claim:

1. An optical code reader for capturing an image of an object in a view volume, comprising
    a housing having an outer opening at a front face thereof;
    a window disposed in the housing proximate to the outer opening;
    a planar printed circuit board disposed toward a rear of the housing and oriented at a first acute angle to the window;
    a primary mirror mounted in the housing at a second acute angle to the window for directing a first perspective of the object in the view volume along a first view segment path;
    an imager mounted on the printed circuit board proximate the primary mirror;
    a secondary mirror disposed in the first view segment path to direct the first perspective of the object toward the imager, the imager being operative for capturing a two-dimensional image of the object from the first perspective;
    an illumination system mounted on the printed circuit board for directing illumination into the view volume,
    wherein the illumination system and the imager are disposed on a common side of the printed circuit board.

2. An optical code reader according to claim 1 wherein the printed circuit board and the primary mirror are disposed parallel to one another.

3. An optical code reader according to claim 1 wherein the printed circuit board is disposed at a first acute angle to the window of between 30° and 60°.

4. An optical code reader according to claim 1 wherein the primary mirror is disposed at a second acute angle to the window of between 30° and 60°.

5. An optical code reader according to claim 1 wherein the illumination system and the imager are disposed on a common side of the printed circuit board but at opposite ends of the primary mirror.

6. An optical code reader for capturing an image of an object in a view volume, comprising
    a housing having an outer opening at a front face thereof;
    a window disposed in the housing proximate to the outer opening;
    a planar printed circuit board disposed toward a rear of the housing and oriented at a first acute angle to the window;
    a primary mirror mounted in the housing at a second acute angle to the window for directing a first perspective of the object in the view volume along a first view segment path;
    an imager mounted on the printed circuit board proximate the primary mirror;
    a secondary mirror disposed in the first view segment path to direct the first perspective of the object toward the imager, the imager being operative for capturing a two-dimensional image of the object from the first perspective;
    an illumination system mounted on the printed circuit board for directing illumination into the view volume;
    an optics chassis, wherein the primary mirror and the secondary mirror are aligned by and mounted on the optics chassis, wherein the optics chassis is mounted onto the printed circuit board.

7. An optical code reader according to claim 6 wherein the optics chassis comprises a single piece molded part onto which the primary mirror and secondary mirror are mounted.

8. An optical code reader according to claim 6 wherein the illumination system and the imager are disposed on a common side of the printed circuit board.

9. A method for reading an optical code on an object in a view volume, comprising the steps of:
    positioning a first imager, a primary mirror, and an illumination system within a reader housing and such that the first imager, the primary mirror, and the illumination system are supported on a common circuit board;
    positioning a window proximate and parallel to an opening at one end the reader housing, wherein the circuit board is oriented at an acute angle to the window;
    directing a first field of view of the first imager via a first mirror set from a position of the first imager into the view volume from a first perspective;
    forming a first image at the first imager of the first field of view into the view volume from the first perspective;
    capturing the first image with the first imager;
    processing the optical code based on one or more images captured by the first imager.

10. A method for reading an optical code on an object in a view volume, comprising the steps of:
    positioning a first imager, a primary mirror, and an illumination system within a reader housing and such that the first imager, the primary mirror, and the illumination system are supported on a common circuit board;
    positioning a window proximate and parallel to an opening at one end the reader housing, wherein the circuit board is oriented at an acute angle to the window;
    directing a first field of view of the first imager via a first mirror set from a position of the first imager into the view volume from a first perspective;

forming a first image at the first imager of the first field of view into the view volume from the first perspective;

capturing the first image with the first imager;

processing the optical code based on one or more images captured by the first imager;

providing an optics chassis of a single piece construction, the optics chassis having mounting positions for the primary mirror and a secondary mirror.

11. An optical code reader for capturing an image of an object in a view volume, comprising a housing having an outer opening at a front face thereof;

a 2D imager disposed in a lower portion of the housing;

a window disposed in the housing proximate to the outer opening and parallel thereto;

a primary mirror mounted at first angle to the window for directing a first 2D perspective of the object in the view volume downwardly and forwardly along a first view path segment;

a secondary mirror mounted in the first view path at a second angle to the window for directing the first 2D perspective of the object from the primary mirror rearwardly along a second view segment path;

a tertiary mirror mounted in the second view path for directing the first 2D perspective of the object from the secondary mirror downwardly to the imager.

12. An optical code reader for capturing an image of an object in a view volume, comprising a housing having an outer opening;

an imager disposed in the housing;

a window disposed in the housing proximate to the outer opening;

an inner wall disposed within the housing, the inner wall having an inner opening;

a mirror disposed in the housing for directing a perspective of the object in the view volume along a view path segment toward the imager, wherein the mirror is mounted behind the inner opening of the inner wall within the housing, the mirror having a visible area defined by the inner opening.

13. An optical code reader according to claim 12 wherein the mirror is mounted via two-side tape secured on a top reflective surface of the mirror.

14. An optical code reader according to claim 12 wherein the inner wall has a rear surface proximate the inner opening, wherein the mirror is mounted against the rear surface of the inner wall.

15. An optical code reader according to claim 12 wherein the mirror is mounted via two-side tape secured on a top reflective surface of the mirror to the rear surface of the inner wall.

16. An optical code reader according to claim 12 wherein the mirror is secured via clips against the rear surface of the inner wall.

* * * * *